(12) United States Patent
Cullen

(10) Patent No.: US 6,748,724 B1
(45) Date of Patent: Jun. 15, 2004

(54) ADJUSTABLE DENSITY CONTROL MEANS FOR A BAGGING MACHINE

(75) Inventor: Steven R. Cullen, Astoria, OR (US)

(73) Assignee: SRC Innovations, LLC, Astoria, OR (US)

(*) Notice: Subject to any disclaimer, the term of this patent is extended or adjusted under 35 U.S.C. 154(b) by 0 days.

(21) Appl. No.: 10/417,444

(22) Filed: Apr. 16, 2003

(51) Int. Cl.⁷ .................................................. B65B 1/24
(52) U.S. Cl. ............................. 53/469; 53/527; 53/567; 53/576
(58) Field of Search .................... 53/527, 529, 567, 53/576, 459, 469; 141/191, 73, 114, 317

(56) References Cited

U.S. PATENT DOCUMENTS

| | | | |
|---|---|---|---|
| 3,687,061 A | 8/1972 | Eggenmuller et al. | 100/65 |
| 4,046,068 A | 9/1977 | Eggenmuller et al. | 100/65 |
| 4,337,805 A * | 7/1982 | Johnson et al. | 141/71 |
| RE31,810 E * | 1/1985 | Lee | 141/114 |
| 4,606,176 A * | 8/1986 | Cundall | 53/567 |
| 4,621,666 A | 11/1986 | Ryan | 141/114 |
| 5,297,377 A | 3/1994 | Cullen | 53/527 |
| 5,425,220 A | 6/1995 | Cullen | 53/527 |
| 5,463,849 A | 11/1995 | Cullen | 53/527 |
| 5,464,049 A | 11/1995 | Cullen | 141/114 |
| 5,517,806 A | 5/1996 | Cullen | 53/527 |
| 5,671,594 A | 9/1997 | Cullen | 53/567 |
| 5,775,069 A | 7/1998 | Cullen | 53/567 |
| 5,857,313 A | 1/1999 | Cullen | 53/567 |
| 5,894,713 A | 4/1999 | Cullen | 53/436 |
| 5,899,247 A | 5/1999 | Cullen | 141/313 |
| 5,960,612 A | 10/1999 | Cullen | 53/436 |
| 6,430,897 B1 * | 8/2002 | Cameron et al. | 53/576 |
| 6,443,194 B1 | 9/2002 | Cullen | 141/313 |
| RE38,020 E | 3/2003 | Cullen | 141/313 |
| 6,655,116 B2 * | 12/2003 | Cullen | 53/527 |

* cited by examiner

Primary Examiner—John Sipos
(74) Attorney, Agent, or Firm—Kolisch Hartwell, P.C.

(57) ABSTRACT

An adjustable density control means is provided for a bagging machine designed for filling or packing material such as silage, compost or the like into an elongated flexible bag. The adjustable density control means comprises an elongated and flexible sheet or belt member which is selectively adjustable positioned beneath the bag being filled and the ground. The weight of the material in the bag on the sheet member resists the forward movement of the bagging machine away from the closed end of the bag. The density of the material being packed or bagged is varied by the length of the sheet member which is positioned beneath the bag being filled.

24 Claims, 4 Drawing Sheets

ADJUSTABLE DENSITY CONTROL MEANS FOR A BAGGING MACHINE

BACKGROUND OF THE INVENTION

1. Field of the Invention

This invention relates to an adjustable density control means for a bagging machine and more particularly to an adjustable density control means for a bagging machine designed to fill or pack material such as silage, compost or the like into an elongated flexible bag. Even more particularly, the invention relates to a method and means for adjustably controlling the density of the material being filled or packed in the bag without the need for a backstop, cable brakes or other density control means located within the material being filled or packed in the bag.

2. Description of the Related Art

Agricultural feed bagging machines have been employed for several years to fill, pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines do function generally satisfactorily, the cables, which are positioned on opposite sides of the bag, can create openings or holes in the bag which will adversely affect the fermentation process within the bag. A further disadvantage of the cable drum and backstop structure of the devices such as shown in the '805 patent is that the cables must be rewound after the filling of an individual bag. A further disadvantage of the cable drum and backstop structure of the machine such as disclosed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely affect the bagging operation. It is also believed that the brake means alone on the bagging machine such as those disclosed in the '666 patent do not achieve the desired compaction of the silage material within the bag.

In U.S. Pat. No. 5,297,377, applicant devised a simple way of controlling the density of the bagged material. In the '377 patent, a density control means was described which included a plurality of cables which were positioned in the flow of the silage material being bagged. In order to vary the density of the material in the machine of the '377 patent, more or less cables would be employed based on the material being packed. For example, corn silage flows easy and would require more cables while alfalfa packs hard and would use less cables. The need to have a convenient means for varying the density, by way of the density control cables, exists and the instant invention provides such a means.

In U.S. Pat. No. 5,425,220, a density control means was described which included a pair of intersecting cables positioned in the flow of the silage material being bagged. In order to vary the density of the material in the machine of the '220 patent, the relationship of the intersecting or crisscrossing cables was varied. Applicant has also received U.S. Pat. Nos. 5,463,849; 5,464,049; 5,517,806; 5,671,594; 5,857,313; 5,894,713; 5,899,247; 5,960,612; and 6,443,194 relating to means for controlling the density of the materials being filled or packed into bags. In each of the patents described above, the density of the material in the bag is controlled by a density control means positioned in the path of the material being bagged. Although it is believed that the above-identified patents of applicant represent significant advances in the art, it is believed that the instant invention truly represents a significant further advance in the art.

SUMMARY OF THE INVENTION

A bagging machine is disclosed for packing or filling material such as silage, compost or the like into a bag. The bagging machine comprises a mobile frame having rearward and forward ends. A material forming enclosure or tunnel is mounted on the mobile frame and has an intake end which receives the material to be bagged and an output end which receives the open mouth of the bag. A material filling or packing apparatus is provided on the frame which moves the material to be bagged rearwardly into the material forming enclosure and into the bag. The material filling or packing apparatus may be a screw conveyor, rotor, packing fingers, etc. A flexible sheet member or belt member is operatively secured to the frame and extends rearwardly with respect to the frame between the bag being filled and the ground to resist the movement of the bagging machine away from the fixed end of the bag. The flexible sheet member is wound upon a rotatable member which may be selectively reversibly driven so as to vary the length of the sheet member which is positioned beneath the bag being filled to adjustably control the density of the material being filled or packed into the bag. The invention also causes the bag to be stretched, thereby increasing the effective length thereof and to reduce wrinkles in the bag. The flexible sheet member may also be utilized to position the folded bag onto the material forming enclosure.

It is therefore a principal object of the invention to provide a method and means for achieving adjustable density in the filling or packing of materials such as silage, grain, compost or the like into a bag.

Yet another object of the invention is to provide a method of achieving adjustable density in the filling or packing of materials into a bag by extending a flexible belt or sheet member under the bag between the bag and the ground.

Yet another object of the invention is to provide a method and means of the type described wherein a flexible belt or sheet member is adjustably extended beneath the bag thereby causing the weight of the filled bag to rest on the extended belt or sheet member.

Still another object of the invention is to provide a method and means of the type described which also smoothes the ground beneath the bag.

A further object of the invention is to provide a method and means of the type described which may be also used to assist in the installation of the bag on the material forming enclosure or tunnel.

Still another object of the invention is to provide a method and means of the type described wherein a flexible belt or sheet member is adjustably extended beneath the bag thereby causing the weight of the filled bag to rest on the extended belt or sheet member which resists the forward movement of the machine, thereby causing the bag to be stretched to increase the effective length thereof and to reduce wrinkles in the filled bag.

These and other objects of the invention will be apparent to those skilled in the art.

DESCRIPTION OF THE PREFERRED EMBODIMENT

Figure 1:
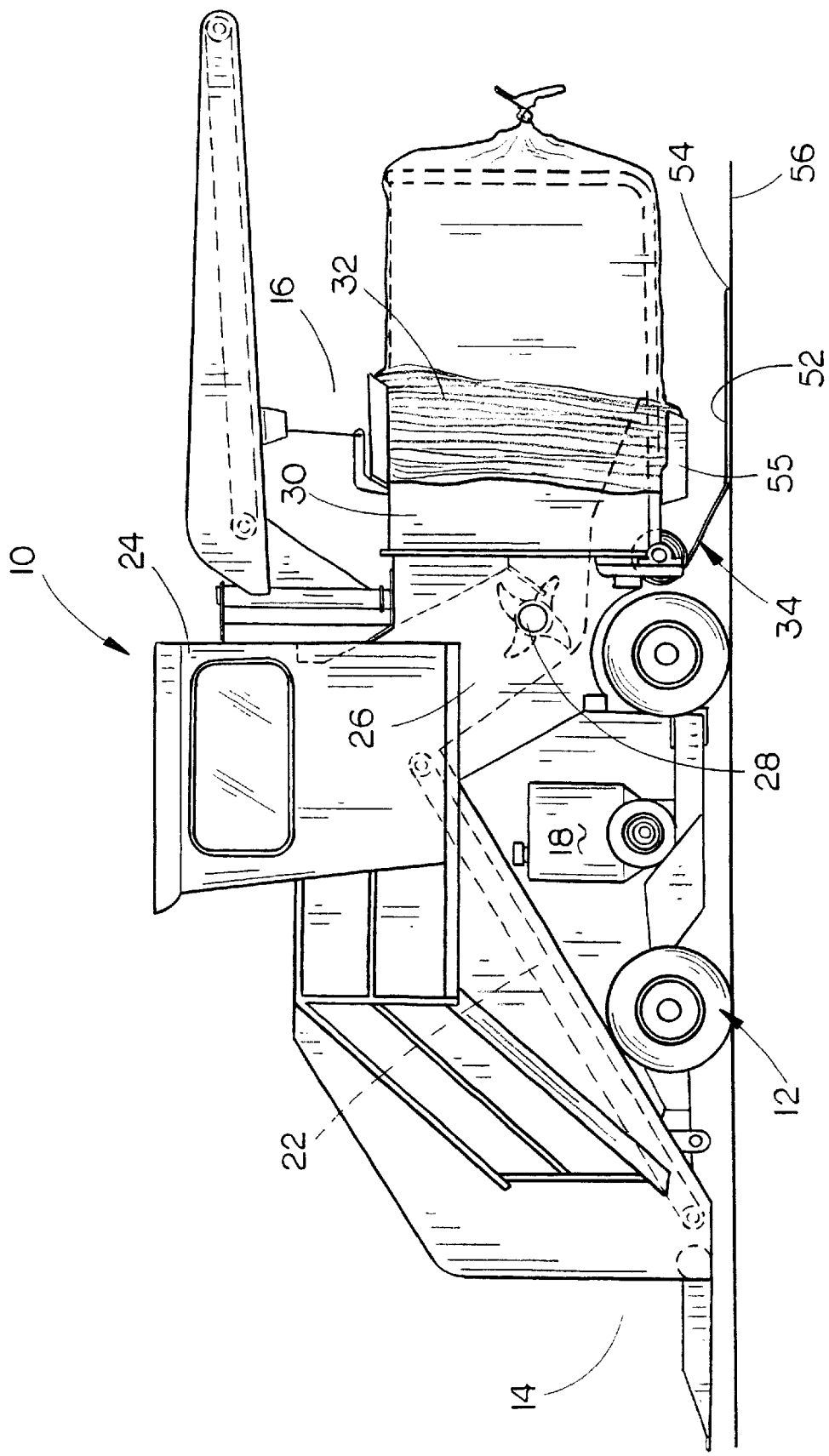
FIG. 1 is a side view of a bagging machine having the adjustable density control means of this mounted thereon.
Figure 2:
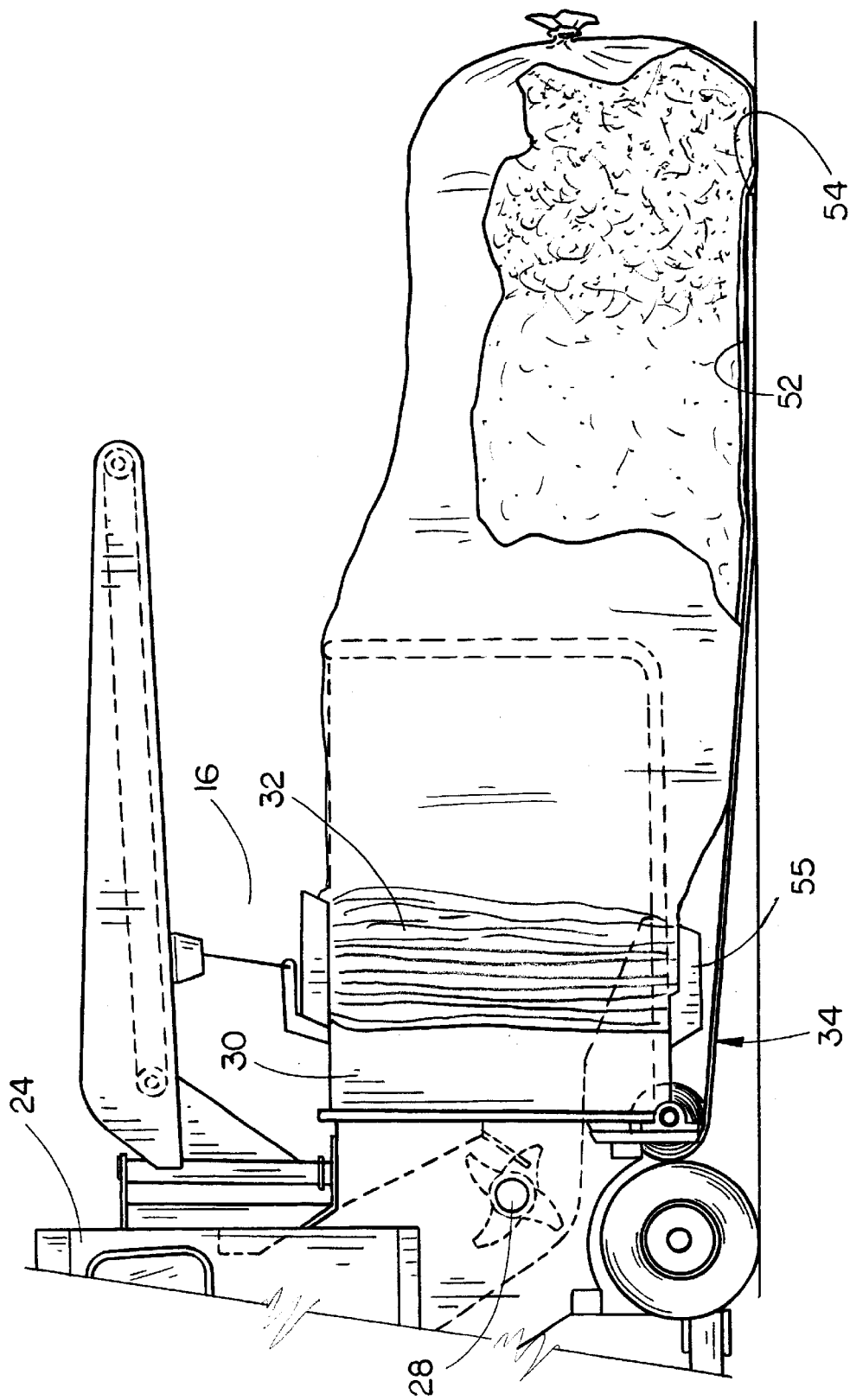
FIG. 2 is a partial side elevational view illustrating the adjustable density control means of this invention being used.

A bagging machine which may be utilized with this invention is referred to generally by the reference numeral 10. Machine 10 includes a mobile or wheeled frame 12 having a forward end 14 and a rearward end 16. Machine 10 also includes an engine 18 for driving machine 10 and the components thereof. If the machine 10 is not self-propelled, the machine 10 may be pulled by a tractor with the power take-off thereof being utilized to power the components thereof. Machine 10 also includes a bumper 20 at its forward end and an inclined feed table 22. Machine 10 further includes an operator's cab 24, hopper 26, a material filling or packing means 28 in the form of a rotor, a material forming enclosure or tunnel 30. The filling or packing means 28 could be in the form of a plunger, screw conveyor, packing fingers, etc.

The numeral 32 refers to a flexible bag or container into which the material is filled, bagged or packed. The adjustable density control means of this invention is referred to generally by the reference numeral 34. A rotatable member such as a winch shaft 36 has its ends rotatably mounted in bearings 38 and 40 which are secured to frame members 42 and 44 of frame 12. A power means 46 is provided for selectively rotating the shaft 36 in either a clockwise or counterclockwise direction as viewed in FIG. 3. The power means is preferably a hydraulic motor and a planetary gear drive mechanism 48 of conventional design although other types of motors and gear drives could be utilized.

A gauge 50 is operatively connected to the hydraulic motor 46 to provide an indication (measurement) of the hydraulic pressure within the hydraulic circuit of the hydraulic motor 46 for a purpose to be described hereinafter.

Figure 3:
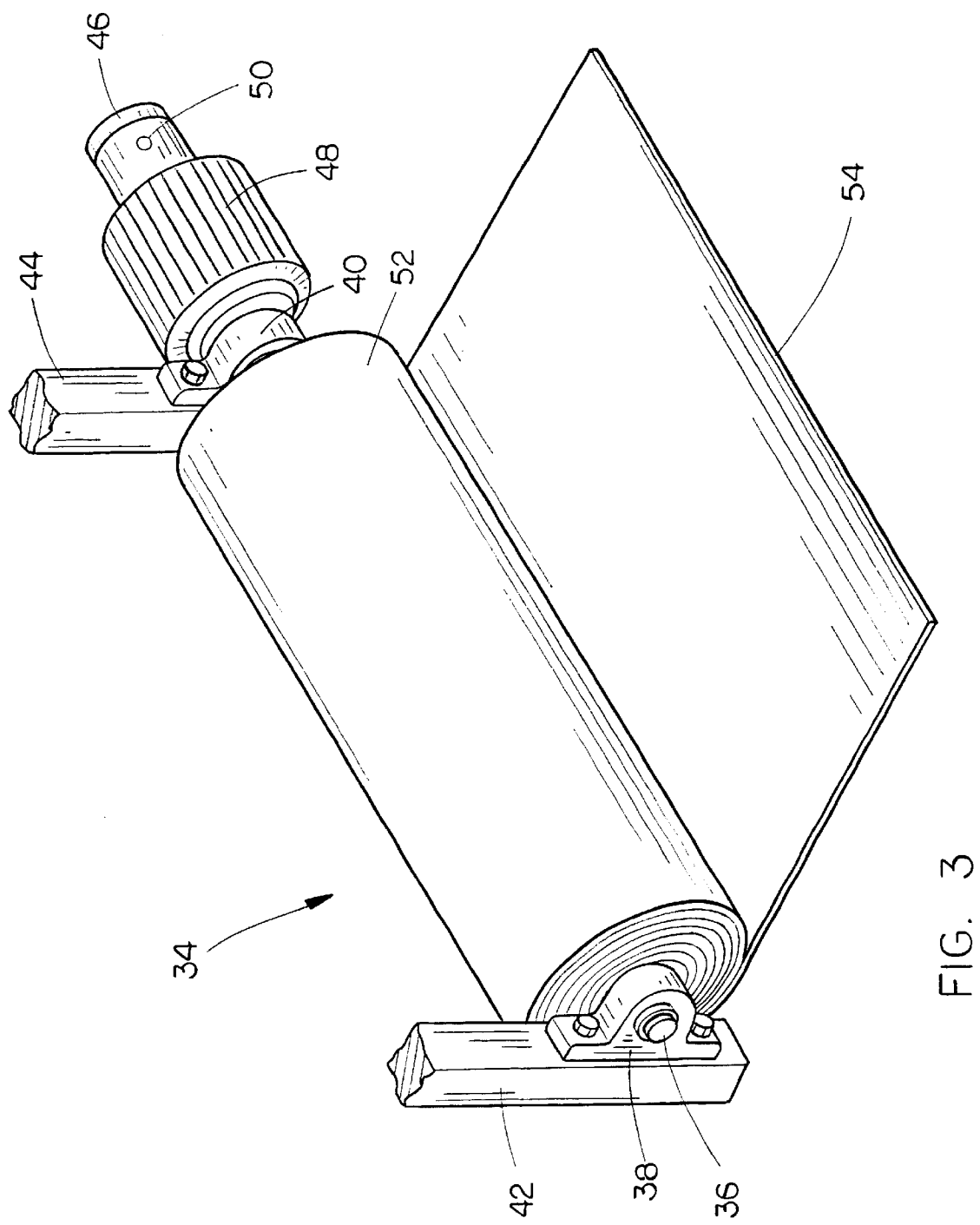
FIG. 3 is a rear perspective view of the adjustable density control means which is mounted on the bagging machine.
Figure 4:
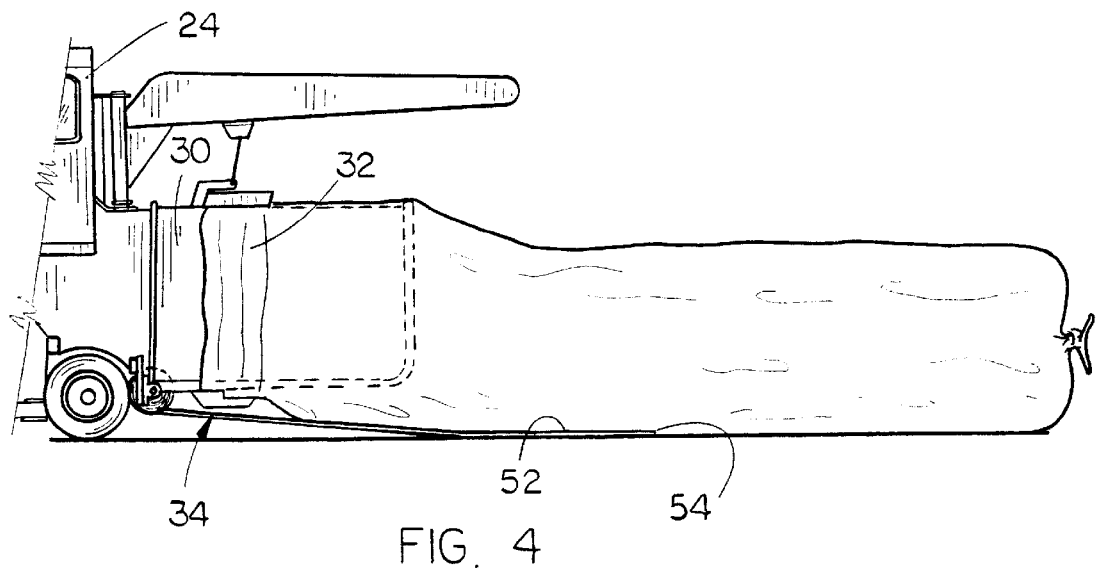
FIG. 4 is a side view illustrating the adjustable density control means of this invention being positioned beneath the bag being filled.
Figure 5:
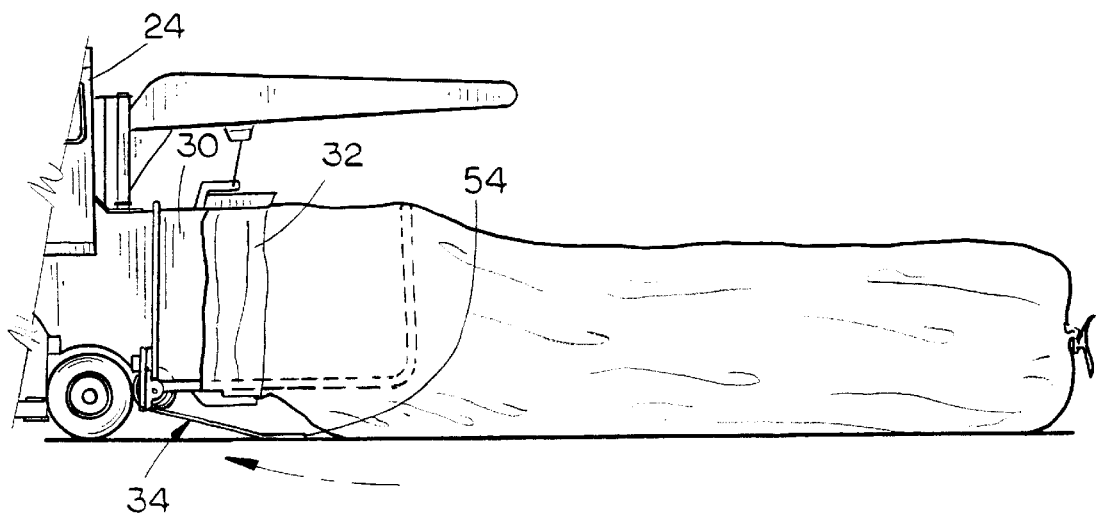
FIG. 5 is a view similar to FIG. 4 but which illustrates the adjustable density control means being removed from beneath the bag.

A flexible belt-like member or sheet member 52 has one end secured to shaft 36 and is wound thereupon, as seen in FIG. 3. The free end (rearward end) 54 of member 52 is designed to be selectively adjustably longitudinally movably positioned between the bottom of the bag 32 and the ground 56. The member 52 may have any length and preferably has a width of four to eight feet, although the width will normally be dependent upon the diameter of the bag being filled. Preferably, sheet member 52 is constructed of a heavy-duty conveyor belt material such as used in conveying particulate material such as aggregate, sand, etc.

One or more horizontally spaced-apart bag retainers 55 are provided on the lower end of the member 30 and are generally identical to the bag retainers disclosed in U.S. Pat. No. 5,408,810. The retainers 55 are designed to limit the bag 32 from being pulled rearwardly from the member 30 during the filling of the bag.

The adjustable density control means 34 of this invention may be initially moved to assist in moving the folded bag 32 forwardly onto the tunnel 30. For example, the motor 46 of the density control means 34 may be operated to unroll the sheet member 52 from the shaft 36 so that the rearward end 54 thereof is positioned rearwardly of the rearward end of the tunnel 30. The bag may then be positioned on the tunnel with the lower end thereof being positioned upon the rearward end of the sheet member 52. The motor 46 is then reversed so that the sheet member 52 is moved or wound upon the shaft 36 which causes the lower end of the folded bag 32 to be moved forwardly until such time as the bag may be lifted upwardly so that the bag retainers 55 will support the lower end of the folded bag 32, as illustrated in FIG. 1. The bag retainers 55 will normally replace the need for a bag pan such as found on most conventional bagging machines.

When it is desired to fill, pack or bag the folded bag 32 on the machine 10, the rearward end thereof is closed, such as illustrated in FIG. 1. The hydraulic motor 46 of the density control means 34 will be operated so that the rearward end 54 of the sheet member 52 is positioned rearwardly of the rearward end of the tunnel 30 with the bag 32 resting thereupon.

As the material is forced into the bag 32 by means of the rotor 28, the machine 10 will move forwardly with respect to the closed end of the bag. The weight of the bag and the material therein on the sheet member 52 will provide a resistance to the forward movement of the machine away from the filled bag. The density of the material may be adjustably controlled by varying the amount of the sheet material 52 which is positioned between the bottom of the bag and the ground. For example, if greater density is desired, a greater length of the sheet member 52 will be positioned beneath the bag. Not only does the sheet member 52 provide an adjustable density control means for the material being bagged, packed or filled in the bag, the weight of the material on the sheet member 52 as the machine moves forwardly also causes the uneven ground beneath the sheet member 52 to be smoothed. The unevenness of the ground may be caused by wheel tracks, etc. The fact that the bag is positioned on even ground results in better bagging. An additional advantage of having the bag positioned on even ground is that the material within the bag is more easily removed therefrom at the desired time, since wrinkles, folds, etc., will not be present in the bottom of the bag which conform to the uneven ground.

Another advantage of the present invention is that the weight of the bag upon the sheet member causes the bag to be pulled or stretched tight which increases the effective length of the bag and which also reduces the wrinkles in the bag which, if present, may reduce the effective length of the bag.

When the bag 32 has been completely filled or filled to the desired capacity, the rotor 28 is inactivated and the motor 46 is activated to pull the sheet member 52 from beneath the bag. The adjustable density control means is disengaged from the bag without pulling any material from within the bag such as may occur when density control cables, anchors, etc., are utilized within the material being bagged.

Thus it can be seen that the invention accomplishes at least all of its stated objectives.

I claim:

1. A bagging machine for bagging material into a bag having a fixed end and an open mouth, comprising:

a movable frame having rearward and forward ends;

a material forming enclosure having an intake end which receives the material to be bagged and an output end which receives the open mouth of the bag;

said material forming enclosure having an upper end and a lower end;

a material filling apparatus on said frame;

said material filling apparatus moving the material to be bagged rearwardly into said material forming enclosure and into the bag;

and a flexible sheet member operatively secured to said frame and extending rearwardly with respect to said frame beneath the bag between the filled bag and the ground to resist the movement of the bagging machine away from the fixed end of the bag.

2. The bagging machine of claim 1 wherein said sheet member has a length and a width and wherein said length is adjustable controlled.

3. The bagging machine of claim 1 wherein said sheet member comprises a belt material.

4. The bagging machine of claim 1 wherein said sheet material is wound upon a selectively rotatable member.

5. The bagging machine of claim 4 wherein said selectively rotatable member controls the length of said sheet member which is positioned beneath the filled bag.

6. The bagging machine of claim 1 wherein said sheet member has a width which is approximately four to eight feet.

7. The bagging machine of claim 1 wherein said sheet member has a width at least as great as four feet.

8. The bagging machine of claim 4 wherein a reversible motor is connected to said selectively rotatable member.

9. The bagging machine of claim 4 wherein said selectively rotatable member is selectively reversible.

10. The bagging machine of claim 8 wherein said reversible motor comprises a hydraulic motor.

11. The bagging machine of claim 10 wherein a hydraulic pressure gauge is operatively fluidly connected to said hydraulic motor to provide the operator with a measurement of the amount of back pressure being exerted on said hydraulic motor by said flexible sheet member as it is being pulled from beneath the bag during the filling process.

12. A bagging machine for packing material into a container having a closed fixed end and an open end, comprising:

a movable frame having rearward and forward ends;

a material forming enclosure having an intake end which receives the material to be packed and an output end which receives the open mouth of the container;

said material forming enclosure having an upper end and a lower end;

a material packing apparatus on said frame;

said material packing apparatus moving the material to be packed rearwardly into said material forming enclosure and into the bag;

and a flexible member operatively secured to said frame and extending rearwardly with respect to said frame beneath the container between the packed bag and the ground to resist the movement of the machine away from the fixed end of the container.

13. The machine of claim 12 wherein said flexible member has a length and a width and wherein said length is adjustable controlled.

14. The machine of claim 12 wherein said flexible member comprises a belt material.

15. The machine of claim 12 wherein said flexible material is wound upon a selectively rotatable member.

16. The machine of claim 14 wherein said selectively rotatable member controls the length of said flexible member which is positioned beneath the packed container.

17. The machine of claim 12 wherein said flexible member has a width which is approximately four to eight feet.

18. The machine of claim 12 wherein said flexible member has a width at least as great as four feet.

19. The machine of claim 15 wherein a reversible motor is connected to said selectively rotatable member.

20. The machine of claim 15 wherein said selectively rotatable member is selectively reversible.

21. The machine of claim 19 wherein said reversible motor comprises a hydraulic motor.

22. The machine of claim 21 wherein a hydraulic pressure gauge is operatively fluidly connected to said hydraulic motor to provide the operator with a measurement of the amount of back pressure being exerted on said hydraulic motor by said flexible member as it is being pulled from beneath the container during the packing process.

23. The method of bagging material into a bag having a closed end and an open mouth, comprising the steps of:

providing a bagging machine including a movable frame having a rearward end and a forward end, a material forming enclosure having an intake end which receives the material to be bagged and an output end which receives the open mouth of the bag, a material filling apparatus on said frame for forcing the material into and through said material forming enclosure and into said bag, and a flexible sheet member operatively secured to said frame extending rearwardly with respect to said frame beneath the filling bag and the ground to resist the movement of the bagging machine away from the fixed end of the bag;

operating said material filling apparatus to force material through said material forming enclosure into said bag;

and controlling the density of the material placed into said bag by varying the distance which said flexible sheet member extends beneath the filling bag.

24. The method of claim 23 wherein said bag is stretched during the bagging operation.

* * * * *